United States Patent [19]

Kim

[11] Patent Number: 5,048,761
[45] Date of Patent: Sep. 17, 1991

[54] PULVERIZED COAL FLOW MONITOR AND CONTROL SYSTEM AND METHOD

[75] Inventor: Raymond K. Kim, Canton, Ohio

[73] Assignee: The Babcock & Wilcox Company, New Orleans, La.

[21] Appl. No.: 493,171

[22] Filed: Mar. 14, 1990

[51] Int. Cl.[5] ............................................ B02C 23/34
[52] U.S. Cl. .................................... 241/19; 110/265;
241/24; 241/34; 241/48; 241/80; 241/119;
406/19; 406/197
[58] Field of Search ...................... 241/18, 19, 57, 24,
241/33, 58, 34, 60, 61, 62, 48, 80, 97, 119, 79.1,
59; 110/263, 265, 222, 232, 229, 104 R, 186;
406/19, 20, 34, 193, 197, 153, 31, 194, 144, 145,
93, 109

[56] References Cited

U.S. PATENT DOCUMENTS 4,830,287 5/1989 Kim .................................. 241/241 X
4,903,901 2/1990 Kim et al. ............................. 241/33

OTHER PUBLICATIONS

G. M. Trivett, A Review of Instruments for the Measurements of Pulverized Coal Mass Flow and Air Flow in Utility Boiler Coal Pipes, Canadian Electrical Assoc., Sep. 1988.
Gas Research Institute, Fundamental Studies of Cavity Flowmeter, Apr. 1989.

Primary Examiner—Timothy V. Eley
Attorney, Agent, or Firm—Daniel S. Kalka; Vytas R. Matas; Robert J. Edwards

[57] ABSTRACT

An apparatus and method for monitoring and controlling the flow of fluid transported solid particles is described. Also an integrated system is disclosed for monitoring and controlling pulverized coal in a non-intrusive manner employing a fluid such as air. The coal flow in each feed pipe is regulated so as to achieve a desired flow balance among the burners in a boiler.

15 Claims, 4 Drawing Sheets

AIR-JET AIR FLOWMETER AS APPLIED TO PULVERIZED COAL FEED PIPE

PULVERIZED COAL FLOW MONITOR AND CONTROL SYSTEM AND METHOD

FIELD OF THE INVENTION

The present invention relates in general to monitoring and controlling the flow of fluid transported solid particles, and in particular to a new and useful apparatus and method for accurately monitoring and controlling the mass flow rate of pulverized coal in a pulverized coal burning boiler.

DESCRIPTION OF THE RELATED ART

In a pulverized coal burning boiler, one or more pulverizers are used to grind lumps of crushed coal into particulates with a certain desired size distribution. The airborne pulverized coal (PC) is typically transported to each burner in feed pipes ranging from 8"-24" in diameter. The number of burners fed by one pulverizer can be anywhere from 2–13 supplied by as many pipes carrying the pulverized coal.

In a multiple-burner boiler operation, it is highly desirable to maintain a good balance among all the burners to attain thermal efficiency and to maintain close control of stack emissions. The flow of pulverized coal is the single most important process variable that needs to be controlled to achieve balanced operation among several burners. To balance the burners, it is necessary to measure and control the coal flow rate and the primary and secondary air flow rates to each burner. Balanced burner operation requires that the mass flow rate of both air and pulverized coal be the same among all the pipes leading to the burner within certain operating limits. Each supply pipe or feed pipe installed between the pulverizer and the burner generally has a hydraulic resistance which is somewhat different from the other supply pipes or feed pipe lines due to differences in overall length of each pipe line, and the type and number of bends used for each pipe line. These variations in line resistance can cause an imbalance of the primary air and coal flow among the pulverized coal supply pipe lines. The imbalance needs to be corrected to insure efficient combustion.

Common industry practice is to add a fixed resistance orifice or sections of small diameter pipe in the line that has a lower resistance than desired. Then the balancing of primary air flow in each line is confirmed by measuring the air flow on each line with a pitot tube in the absence of pulverized coal flow. However, the balanced primary air flow alone does not necessarily ensure a balanced pulverized coal flow in the system due to the asymmetric flow distribution at the pulverizer outlet and the peculiarities in the airborne solids flow.

Despite the express need, the development of pulverized coal flow monitoring and controlling devices have been severely hampered for two basic reasons. The highly abrasive pulverized coal flow precluded use of any intrusive means, and the extremely non-uniform and unstable pulverized coal flow interfered with most of the non-intrusive methods tried and prevented them from achieving an acceptable level of measurement accuracy.

Over the years a number of methods have been tried to measure mass flow rates of pulverized coal flowing in pipes. They include such intrusive approaches as using pressure difference, mass reaction, turbine flowmeter and Coriolis mass flowmeter. The non-intrusive methods include: thermal, nuclear, electrical, magnetic, optical, acoustic, and ultrasonic.

U.S. Pat. No. 4,830,287 which is owned by the present Assignee discloses a pulverized coal flow control system with an aspirator connected to the outer wall of a bend provided in the supply pipe. The aspirator draws off an amount of mixture from the supply pipe and re-injects it back into the pulverizer. As a result, the flow mixture is controlled through the supply pipe.

The foregoing pulverized coal flow control system needs diverted control bypass lines which can be costly to install.

U.S. Pat. No. 4,903,901 which is also owned by the present Assignee and hereby incorporated by reference discloses a pulverized coal flow controller employing a number of jets which inject a fluid such as compressed air to interfere with the normal flow of primary air. The reduction of primary air flow is controlled by the fluid injection pressure. A reduction in primary air flow causes a decrease in the coal flow which allows for balancing the burners.

In order to control the coal flow distribution to the burners connected to a common pulverizer, a knowledge of the existing coal distribution is necessary before corrective action can be taken. Consequently, a measure of the coal flow rate in each feed pipe must be determined.

Accordingly, there is a need for an integrated system which determines the coal flow rate in each feed pipe and then controls the coal flow in each feed pipe which as a result balances the coal flow distribution to the burners.

SUMMARY OF THE INVENTION

The present invention solves the problems associated with the prior art by providing an integrated system for monitoring and controlling the flow of fluid transported solid particles. The apparatus and method of the present invention determines the mixture and the air flow rates in each of a plurality of feed pipes so that the mass flow rate of the transported solid particles contained therein may be determined from the difference. Once the mass flow rate in all of the feed pipes is known, depending on the extent of the existing flow rate imbalance, a fluid such as air is injected into a feed pipe in a controlled manner to cause a pneumatic resistance in the line to increase relative to the other feed pipes connected to the common pulverizer. As a consequence, the mass flow rate of the transported solid particles in the line decreases by a small amount in proportion to the applied injection pressure which causes the flow in the other lines to increase. This is repeated for all or some of the lines until a desired level of flow balance among the lines is achieved.

Accordingly, an aspect of the present invention is directed to a method and apparatus for monitoring and controlling the flow of fluid transported solid particles.

Another aspect of the present invention is directed to a pulverized coal flow monitor and control system.

A further aspect of the present invention is to provide a pulverized coal flow monitor and control system which is simple in design, rugged in construction, and economical to manufacture.

The various features of novelty characterized in the invention are pointed out with particularity in the claims annexed to and forming a part of this disclosure. For a better understanding of the invention, and the operating advantages attained by its use, reference is

DESCRIPTION OF THE PREFERRED EMBODIMENT

Figure 1:
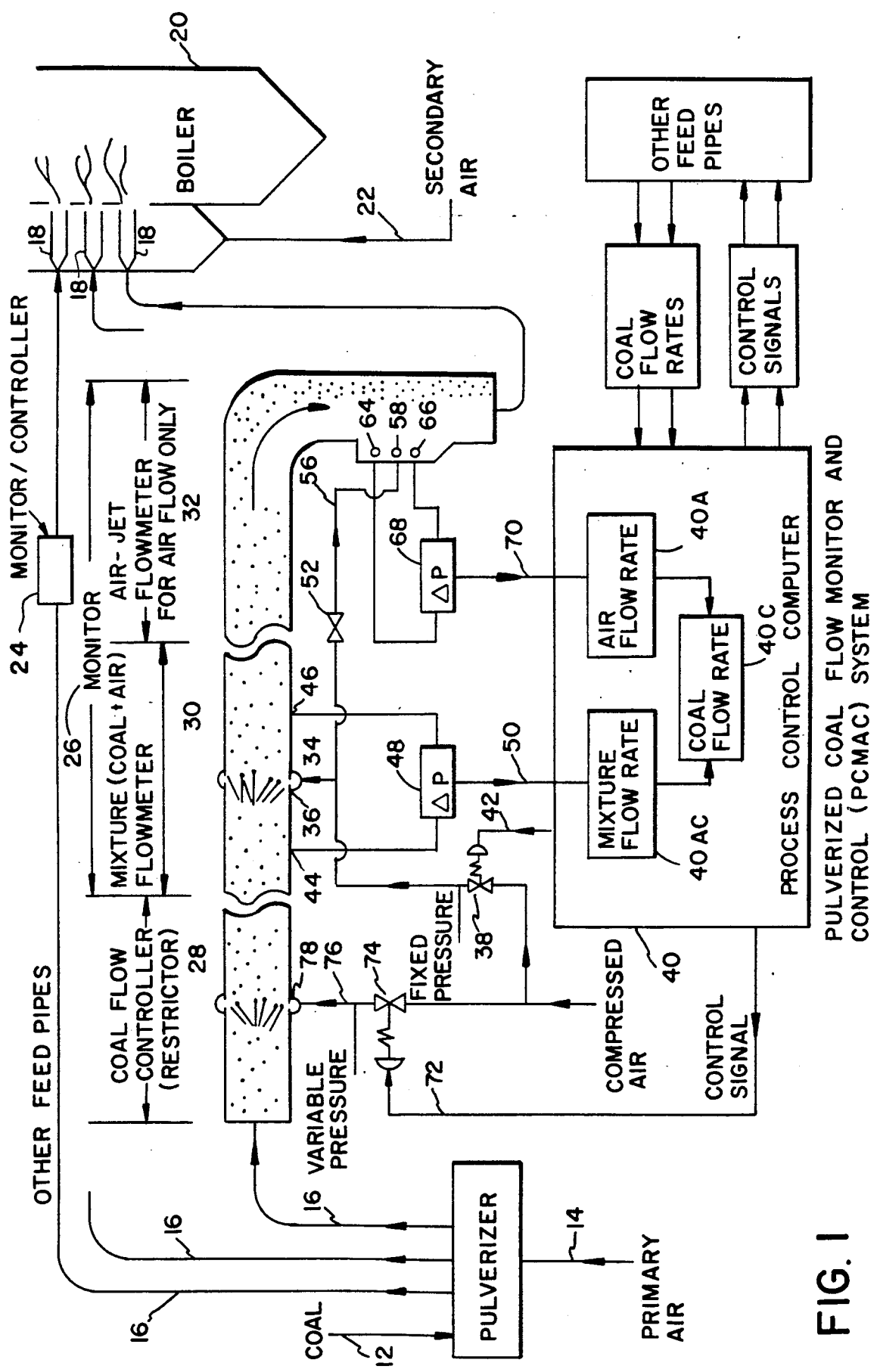
FIG. 1 is a schematic representation of the pulverized coal flow monitor and control system according to the present invention with one of the monitor/controllers being enlarged and in section.

Referring to the drawings in which like reference characters designate like or corresponding parts throughout the several views, in particular, FIG. 1 illustrates the pulverizer (10) having grinding wheels (not shown) therein for grinding coal supplied thereto along line (12) from a source. Primary air (14) is supplied to the pulverizer (10) for pneumatically suspending the solid particles of pulverized coal produced in the vessel (10). The solid particles of pulverized coal are conveyed out of the vessel (10) through feed pipes (16) which ultimately reach the burners (18) of a furnace or a boiler (20). Secondary air (22) is normally supplied to the burners (18) to ensure complete combustion. Positioned in each of the feed pipes (16) is a pulverized coal flow monitor and control system generally designated (24).

The pulverized coal flow monitor and control (PCMAC) system (24) consists of a pulverized coal flow monitor generally designated (26) and a pulverized coal flow controller (28). Pulverized coal flow monitor (26) consists of a coal/air mixture flow meter (30) and an air flow meter (32). Each of the three components, i.e., air flow meter (32), air/coal mixture flow meter (30), and pulverized coal flow controller (28), making up the integrated system of the present invention will be discussed in detail.

Prior to an operator taking any type of control action, the present status of the flow in the feed pipes (16) must be known. Accordingly, the operator is interested in monitoring the coal flow rates in all of the feed pipe lines (16) connected to the common pulverizer (10). The monitored coal flow rates in lines (16) are then used as the basis of any corrective action, if necessary. These monitoring tasks are accomplished in the present invention in two steps: (1) to determine the mass flow rate of the coal/air mixture, and (2) to measure the air flow rate, separately. The coal mass flow rate is then determined by subtracting the air flow rate from the mixture flow rate.

In the coal/air mixture flow meter (30), compressed air from a source is supplied along line (34) to a plurality of holes, slits, or nozzles (36) where it is injected into each feed pipe (16). The air is injected at a predetermined constant pressure such as 15 psig provided by the pressure regulating valve (38) which may be either manually or remotely operated by a process control computer (40) along line (42). Preferably, the air is injected at an angle of about 45° against the flow so that the air streams interfere with the flowing coal and primary air, causing a pressure drop that is proportional to the mass flow rate of the mixture. The pressure drop is measured with a pair of static pressure sensors (44, 46) placed upstream and downstream of the air nozzles (36), respectively. The pressure difference is relayed by the differential pressure transducer (48) to the process computer (40) along line (50). The coal/air mixture mass flow rate is determined by a calibration equation stored in the process computer (40) and a signal indicative thereof is retained in its memory 40 AC.

Figure 2:
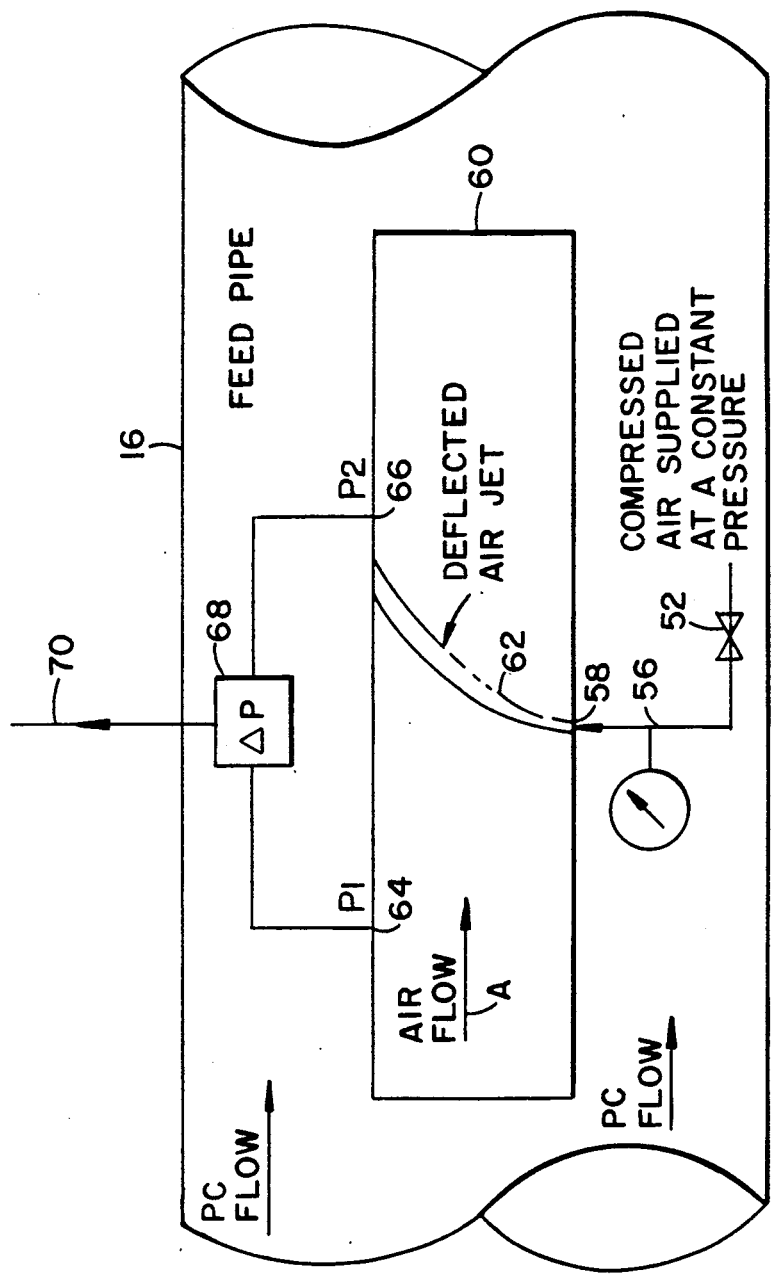
FIG. 2 is a partial sectional illustration of an air flow meter as employed in a portion of the feed pipe according to the present invention.
Figure 3:
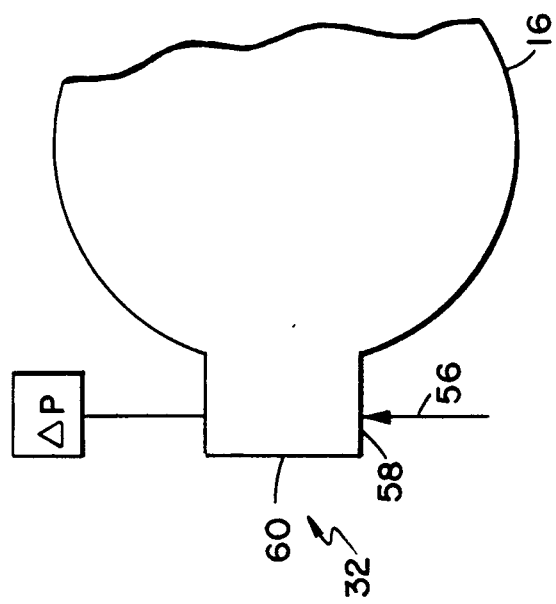
FIG. 3 is a cross-sectional illustration of FIG. 2.

While the coal/air mixture flow meter (30) is engaged, the air flow meter (32) is activated when valve (52) is opened either manually or remotely as is illustrated in FIG. 2. Valve (52) supplies a fluid such as compressed air at a constant pressure along line (56) to an air nozzle or an opening (58) positioned in one side of a flow channel or groove (60) as is shown in FIGS. 2 and 3. The air supplied from the air nozzle (58) is deflected in the direction indicated by lines (62) from the air flow in the channel as indicated by the arrow A. Flow channel (60) is preferably rectangular and is located on a section of a straight pipe (16) where entrenchment or coal "roping" is unlikely such as following a bend. The term "roping" is a term known to those skilled in this art which represents a form of severe spatial and temporal maldistribution induced in mixture flows of widely different component densities. It is a condition where a large portion of the coal flow is in a band running along one side of pipe (16). There are not any successful methods to account for "roping" because of the instability and unpredictability inherent in this behavior. The air deflected (62) by the air flow in the channel (60) produces a velocity-dependent pressure difference between pressure sensors (64, 66) which are situated upstream and downstream, respectively, of the air nozzle (58). The pressure transducer (68) sends the pressure difference to the process computer (40) via line (70) where the computer (40) determines the air flow rate from the calibration equations stored therein. The computer (40) generates a signal indicative of the air flow rate and retains it in memory (40A). Then, the process computer (40) establishes a control signal indicative of the coal flow rate in memory (40C) by taking the difference of the mixture (40AC) and the air flow rates (40A).

After the coal mass flow rates in all of the feed pipes (16) connected to the pulverizer (10) are determined, the flow-balancing procedure is initiated. Referring to FIG. 1, depending on the extent of the existing flow imbalance and the degree of correction desired, the process control computer (40) either automatically or manually sends a control signal along line (72) to a pressure regulating valve (74). Fluid such as air is provided from a source along line (76) and is controlled by pressure regulating valve (74) where it is injected by a plurality of holes, slits, or nozzles (78) situated circumferentially around feed pipe (16). The injection nozzles (78) provide a momentum of air so as to cause an interference with the pulverized coal flow in the feed pipe (16). This momentum input from the injection nozzles (78) is variable by increasing or decreasing the injection air pressure with pressure regulating valve (74). The interfering air streams cause a pneumatic resistance in the feed pipe (16) to increase relative to the other feed pipes (16) connected to the common pulverizer (10). As a consequence, the pulverized coal mass (coal +air) flow rate in the line decreases by a small amount, $\Delta$ m in proportion to the applied injection pressure, and the flow in the other feed pipes (16) increases theoretically by $\Delta$ m/n, where n is the number of feed pipes (16). This controlling process is repeated for all or some of the feed pipes (16) until a desired level of flow balance is achieved.

Figure 4:
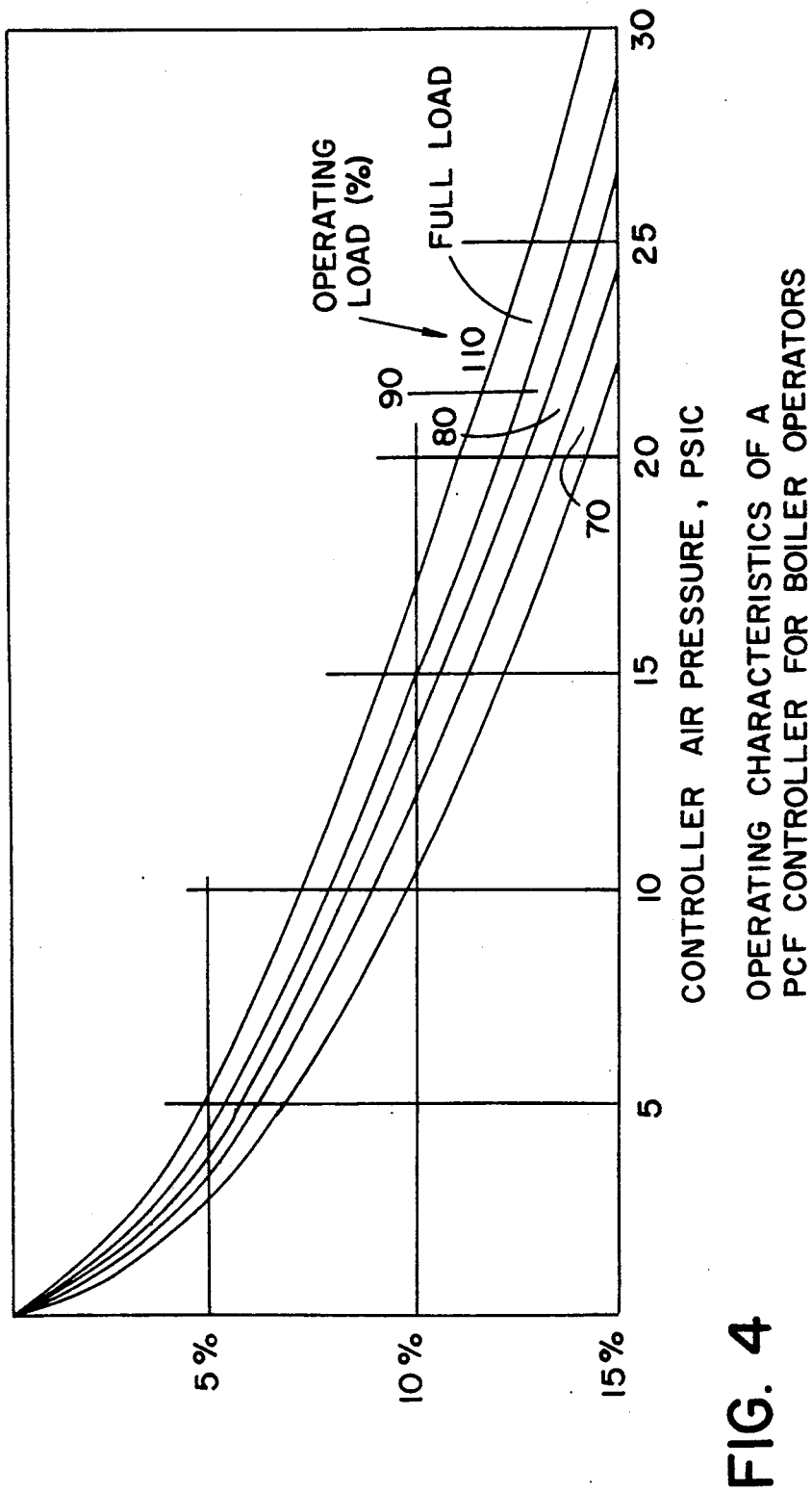
FIG. 4 is a graph illustrating the operating characteristics of a pulverized coal flow controller for boiler operators in accordance with the present invention.

FIG. 4 is a graph representing the operating characteristics of a pulverized coal flow controller in accordance with the present invention for boiler operators. For instance, if a 5% reduction in a particular feed pipe (16) is desired, the process computer (40) or operator adjusts the controller air pressure (74) to 5 psig.

Although the present invention was conceived primarily to solve the problems associated with airborne coal particles at boiler plants, the present invention has wider applications in any fluid transport system carrying solid particles. The fluid may either be a gas or a liquid. When employing a liquid fluid system, pumps generate injection pressure to decrease the fluid flow. Alternatively, a gas may be used to decrease liquid fluid flow transporting solid particles. Specifically, the present invention finds particular utility and applications where the flowing media is highly erosive and where the system cannot tolerate an appreciable increase in pressure drop as well as where long-term reliable service is required. Many processes in the petrochemical, food processing, and pharmaceutical industries transport solid particles in powder pneumatically. The flow rates of the solids often need to be controlled on-line.

While a specific embodiment of the invention has been shown and described in detail to illustrate the applications and the principles of the invention, certain modifications and improvements will occur to those skilled in the art upon reading the foregoing description. It is thus understood that all such modifications and improvements have been deleted herein for the sake of conciseness and readability, but are properly within the scope of the following claims. An example of such a modification is to taper the downstream end of the flow channel (60) towards the inside wall of the feed pipes (16) to prevent excess erosion.

What is claimed is:

1. A method for monitoring and controlling the flow of fluid transported solid particles, comprising the steps of:
   suspending solid particles in a vessel to form a mixture of solid particles in a primary fluid;
   discharging the mixture through at least one feed pipe out of the vessel;
   measuring the flow of the primary fluid in each feed pipe and establishing a signal indicative thereof;
   measuring the flow of the mixture in each feed pipe and establishing a signal indicative thereof;
   calculating a mass flow rate of the transported solid particles from a difference in the mixture flow rate and the primary fluid flow rate and establishing a control signal indicative of the mass flow rate in each feed pipe; and
   controlling fluid injection in each feed pipe responsive to changes in the control signal.

2. A method as recited in claim 1, wherein the primary fluid flow measuring step further comprises the steps of:
   positioning a flow channel in each feed pipe;
   injecting a fluid under pressure in one side of the flow channel; and
   sensing pressure upstream and downstream of the injected fluid for determining a differential pressure.

3. A method as recited in claim 1, wherein the mixture flow measuring step further comprises the steps of:
   injecting a fluid at a predetermined constant pressure in each feed pipe; and
   sensing the pressure upstream and downstream of the injected fluid for measuring a pressure difference.

4. An apparatus for monitoring and controlling the flow of fluid transported solid particles, comprising:
   a vessel for containing a mixture of primary fluid with suspended particles;
   at least one feed pipe connected to said vessel for supplying a flow of said mixture from said vessel;
   means for measuring flow of the primary fluid situated in each feed pipe and establishing a signal indicative thereof;
   means for measuring flow of the mixture situated in each feed pipe and establishing a signal indicative thereof;
   means for determining a mass flow rate of the transported solid particles from the primary fluid flow rate signal and the mixture flow rate signal in each feed pipe, said determining means establishing a control signal indicative of the mass flow rate in each feed pipe; and
   means for regulating fluid injection in each feed pipe responsive to changes in the control signal.

5. An apparatus as recited in claim 4, wherein said primary fluid flow measuring means includes each feed pipe having a flow channel situated thereon, means for injecting a fluid under pressure in one side of the flow channel, and at least two pressure sensors mounted in the opposite side of the flow channel for determining differential pressure.

6. An apparatus as recited in claim 4, wherein said mixture flow measuring means includes means for injecting a fluid at a predetermined constant pressure in each feed pipe and at least two pressure sensors with one sensor being situated upstream of the injecting means and the other downstream thereof for measuring a pressure difference.

7. An apparatus as recited in claim 4, wherein said determining means includes a process computer having calibration equations stored therein for determining the mass flow rate of the transported solid particles in each feed pipe from a difference between the mixture mass flow rate and primary fluid flow rate.

8. An apparatus as recited in claim 7, further comprising means for displaying the solid particle mass flow rate in all of the feed pipes.

9. An apparatus as recited in claim 4, wherein said regulating means includes means for injecting a fluid under pressure into each feed pipe, said injecting means being situated so that the injected fluid causes a pneumatic resistance in the feed pipe to effect a decrease in mixture mass flow rate therethrough.

10. A pulverized coal flow monitor and control system, comprising:
   at least one pulverizer for grinding coal, each pulverizer containing a mixture of primary air with suspended coal particles;
   a plurality of feed pipes connected to each pulverizer for supplying a flow of the mixture to a furnace;
   means for measuring primary air flow situated in each feed pipe and establishing a signal indicative thereof;

means for measuring flow of the mixture positioned in each feed pipe and establishing a signal indicative thereof;

means for determining the coal flow rate in each feed pipe from a difference between the mixture mass flow rate and the air flow rate, said determining means providing a control signal indicative of the coal flow rate; and means for regulating the coal flow rate in each feed pipe responsive to changes in the control signal.

11. A pulverized coal flow monitor and control system, as recited in claim 10, wherein said primary air flow measuring means includes each feed pipe having a flow channel situated thereon, an air nozzle positioned in one side of the flow channel, said air nozzle being connected to a supply of air, and at least two pressure sensors mounted on opposite sides of said air nozzle for determining differential pressure which correlates to the primary air flow rate.

12. A pulverized coal flow monitor and control system, as recited in claim 11, wherein said flow channel is tapered at a downstream end.

13. A pulverized coal flow monitor and control system, as recited in claim 10, wherein said mixture flow measuring means includes means for injecting air at a predetermined constant pressure in each feed pipe and at least two pressure sensors positioned therein with one sensor being situated upstream of the injecting means and the other downstream thereof for sensing a pressure difference.

14. A pulverized coal flow monitor and control system, as recited in claim 10, wherein said determining means includes a process computer having calibration equations stored therein, said process computer receiving the primary air flow rate and mixture flow rate signals for determining the coal flow rate and establishing a control signal indicative thereof.

15. A pulverized coal flow monitor and control system, as recited in claim 10, wherein said regulating means includes a plurality of air nozzles circumferentially oriented around each feed pipe for injecting air in response to the control signal.

* * * * *